July 30, 1963   C. ARBTER ETAL   3,099,234
MANUFACTURE OF BAGLIKE STRUCTURES
Filed May 2, 1960   15 Sheets-Sheet 1
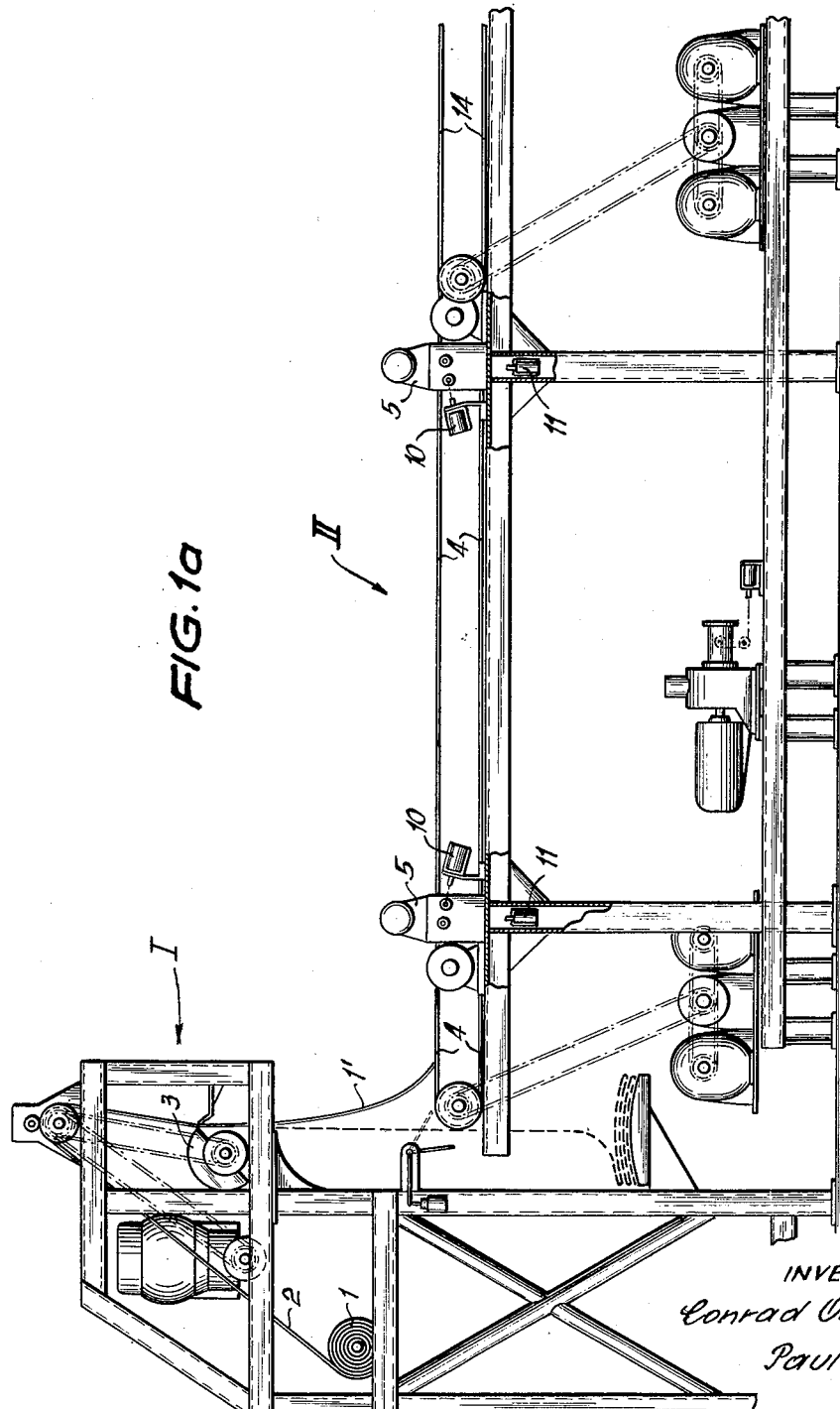
INVENTORS
Conrad Arbter
Paul Schwen-
dinger
BY Richard Low

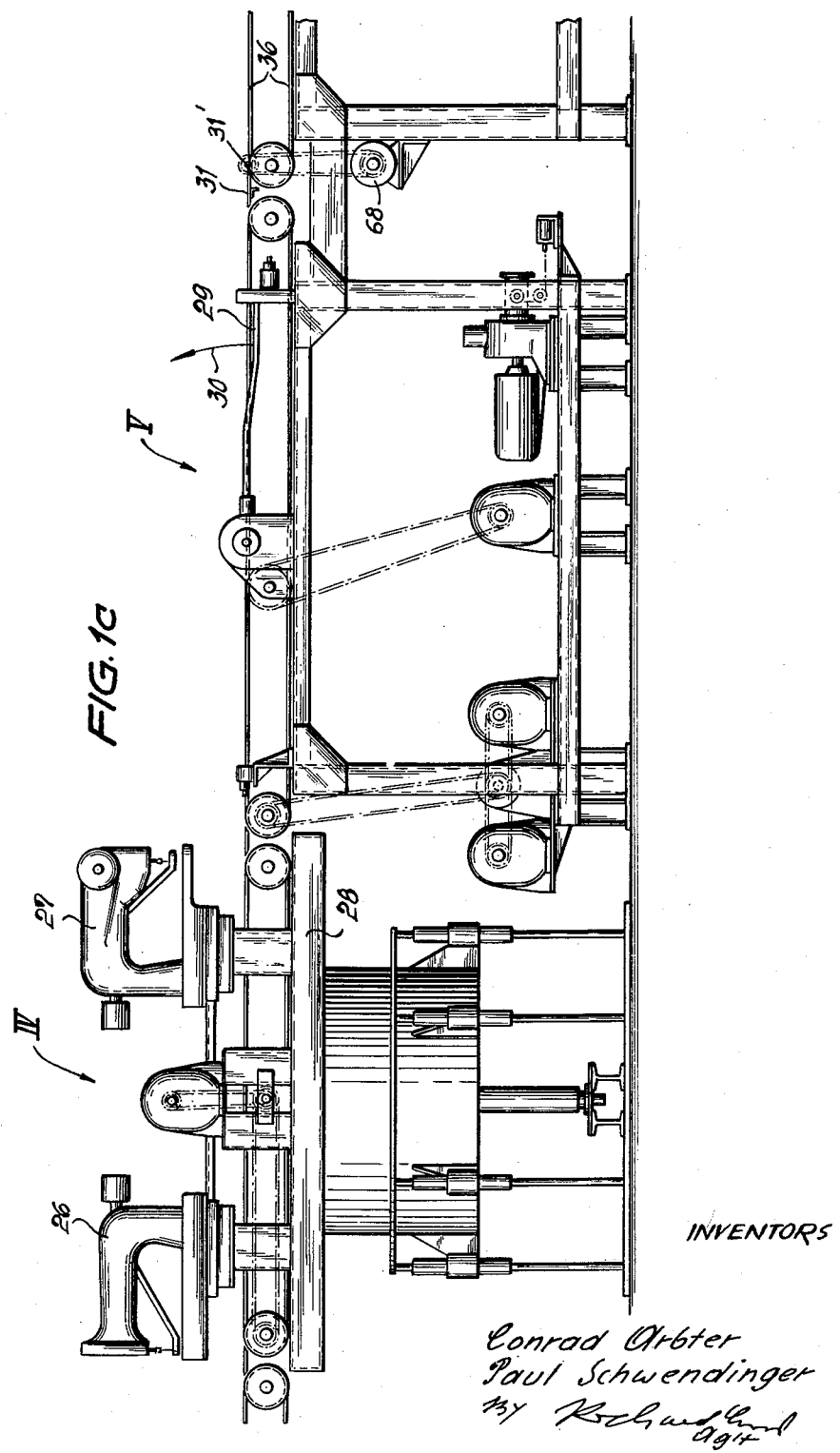

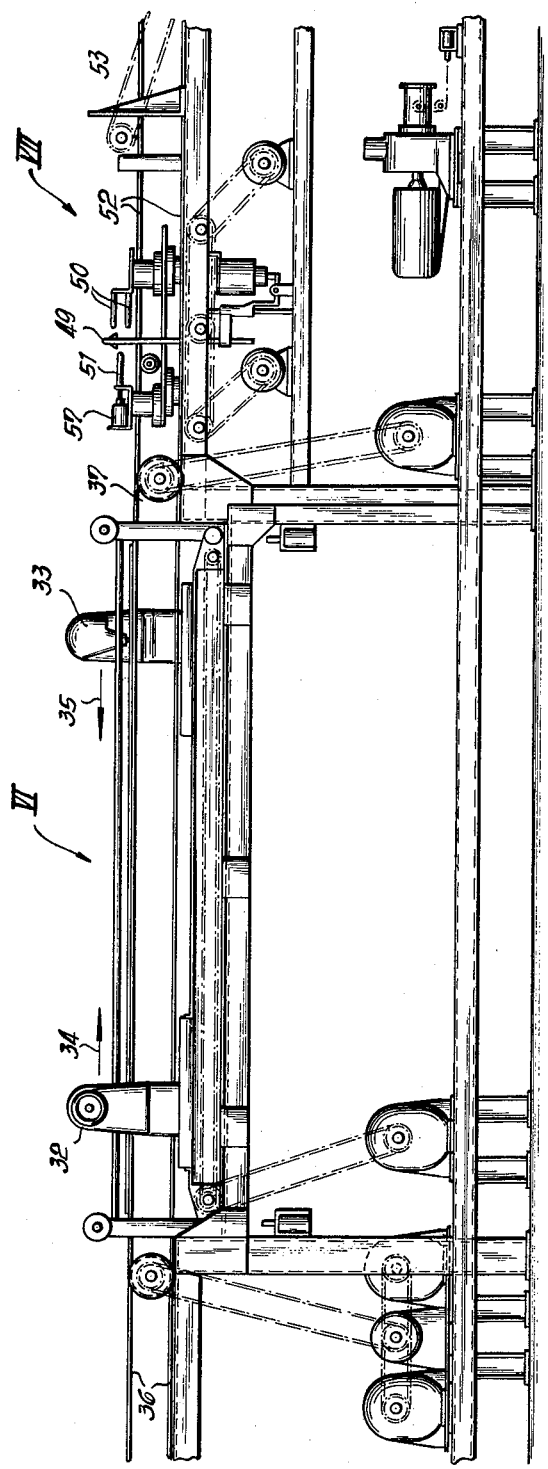

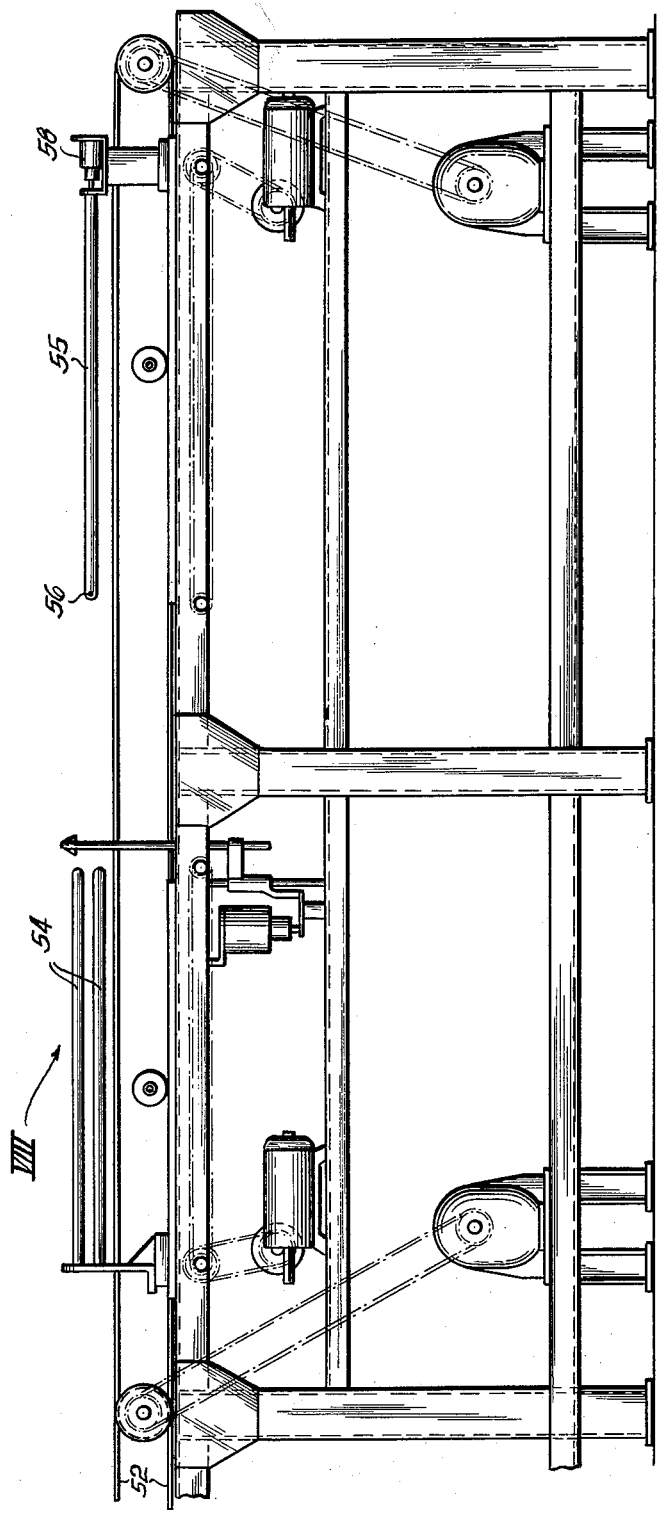

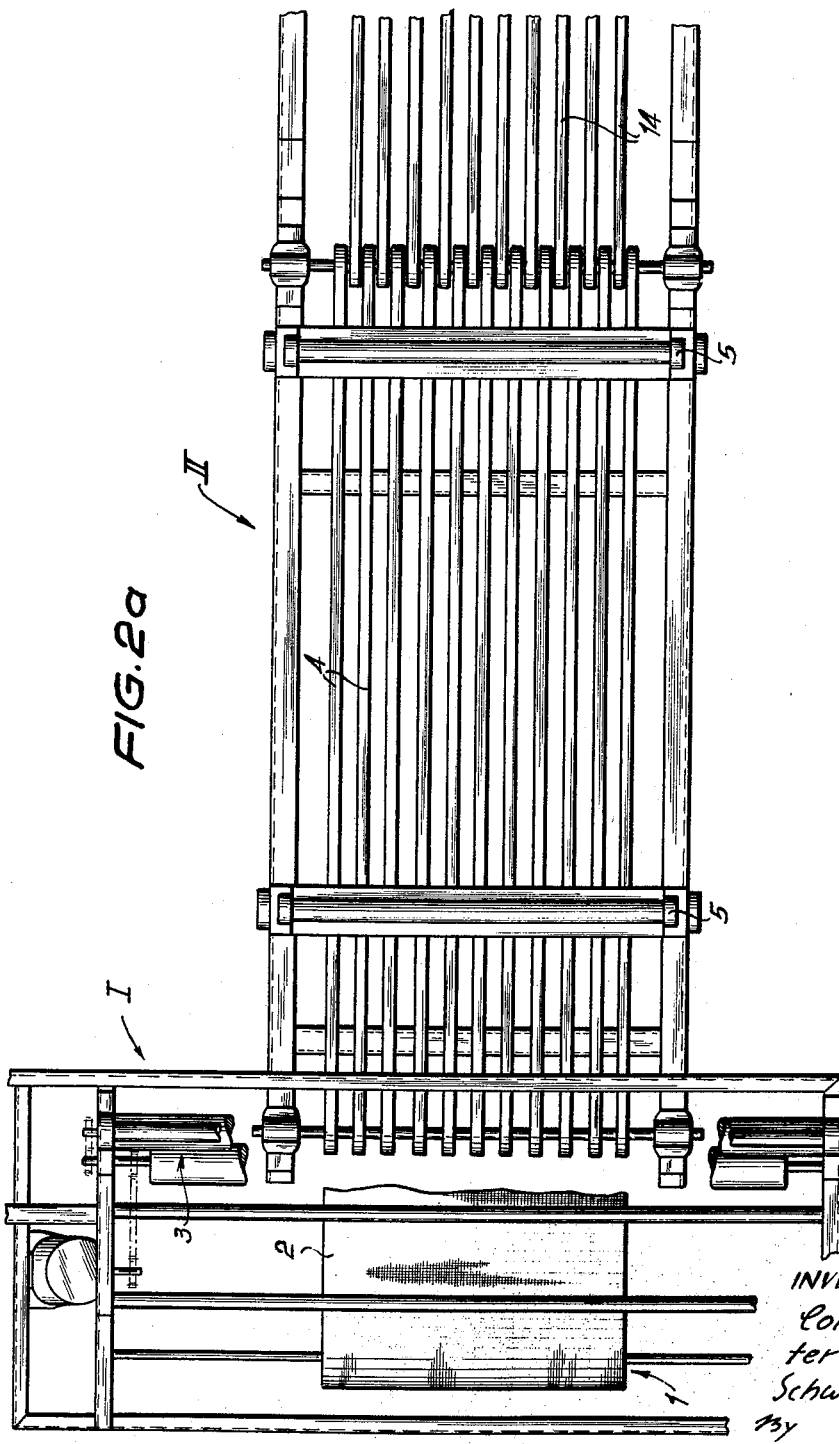

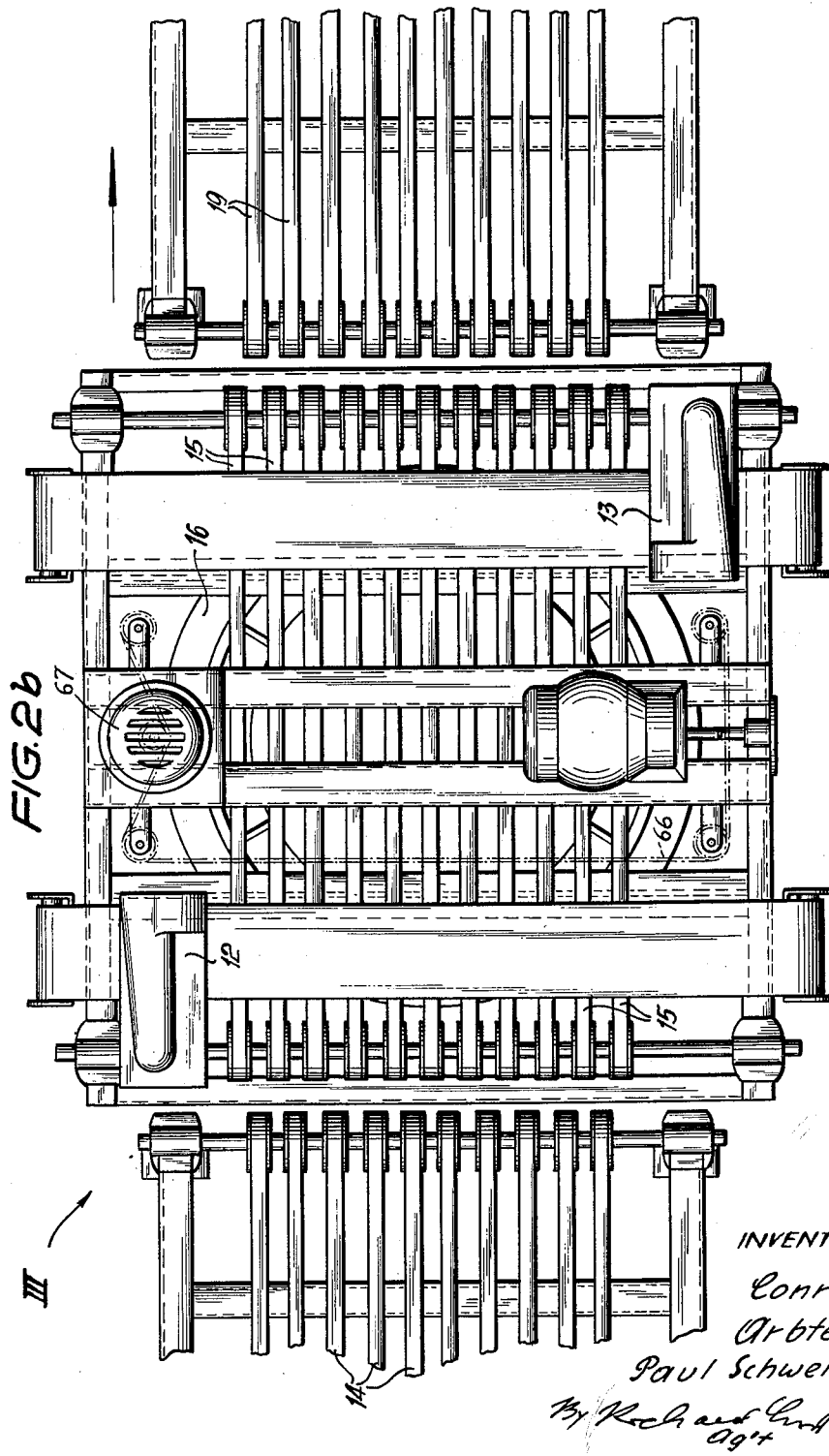

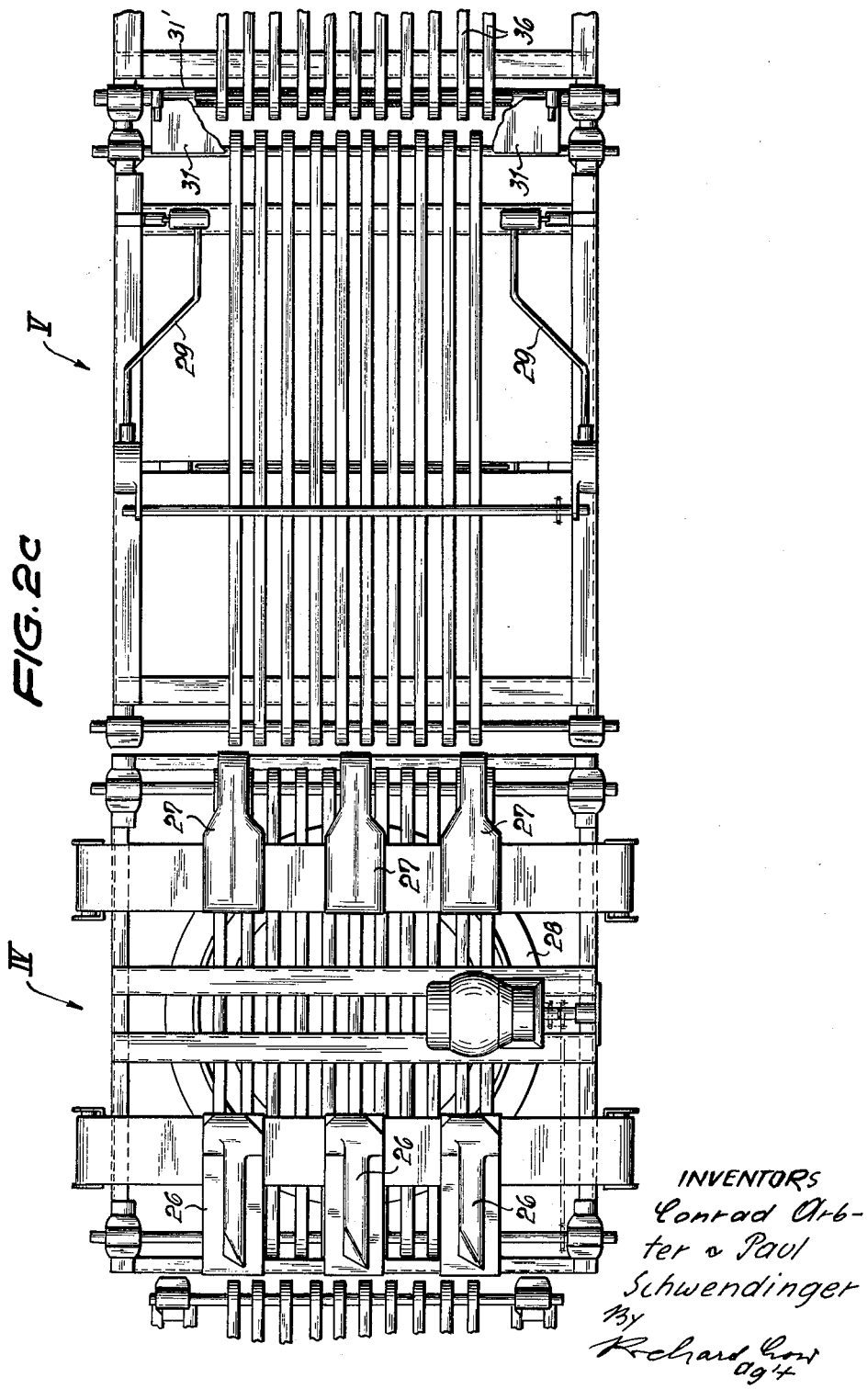

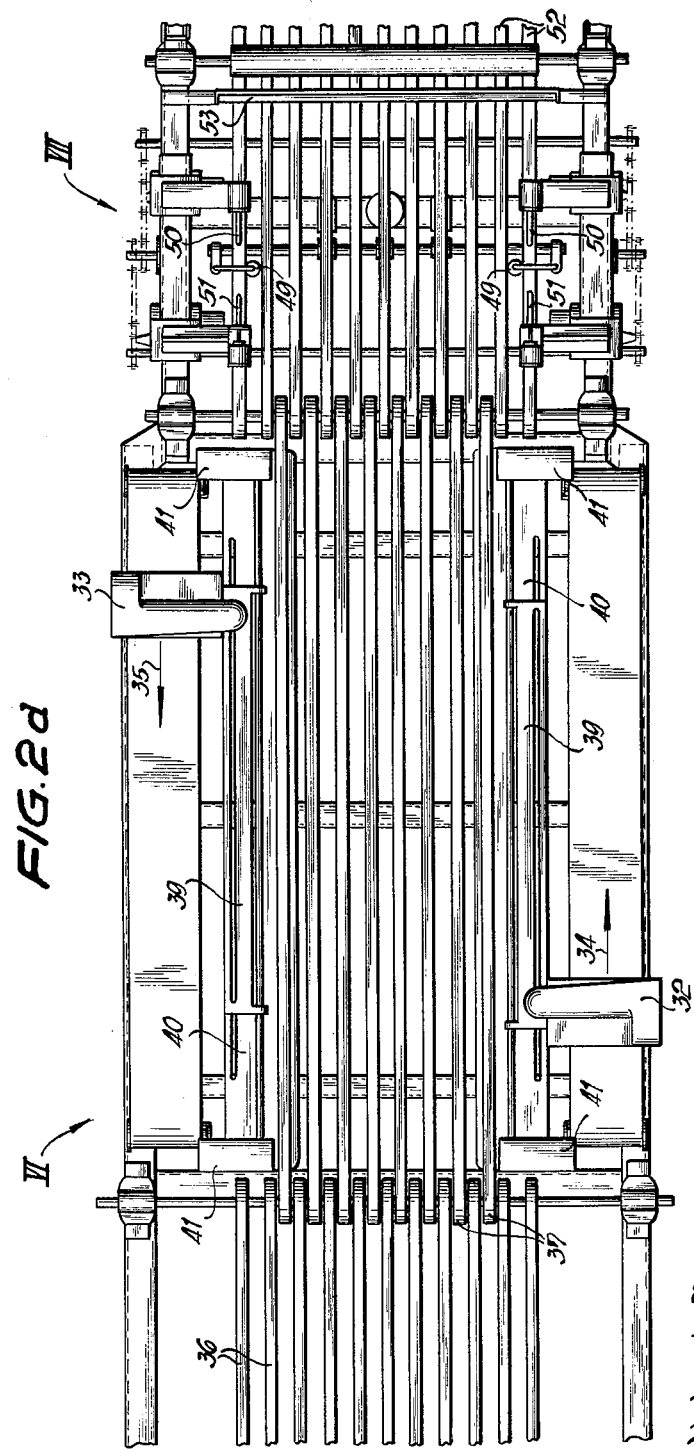

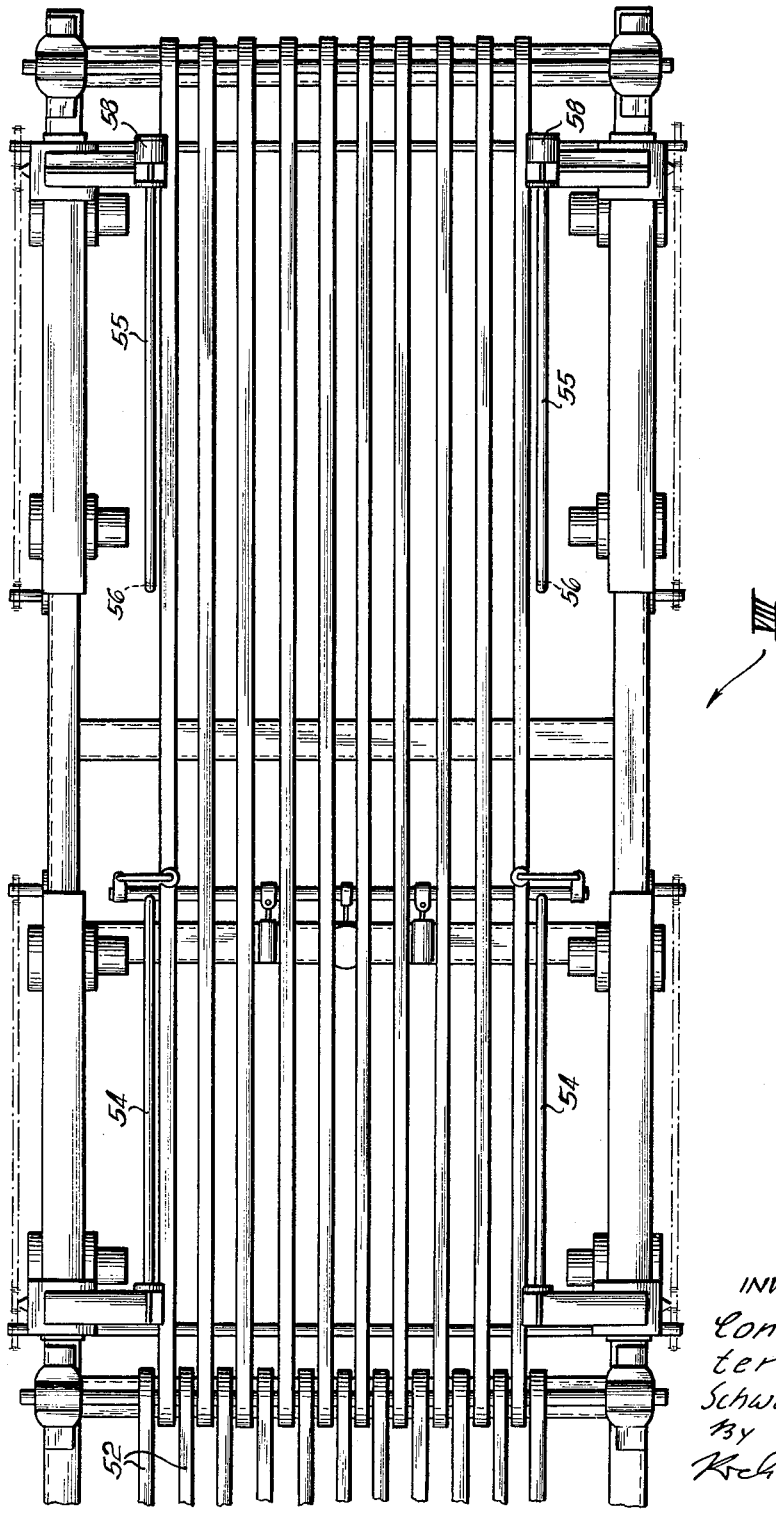

July 30, 1963

C. ARBTER ETAL 3,099,234

MANUFACTURE OF BAGLIKE STRUCTURES

Filed May 2, 1960

INVENTORS
Conrad Arbter
Paul Schwendinger

By Richard Lind
Agt

July 30, 1963  C. ARBTER ETAL  3,099,234
MANUFACTURE OF BAGLIKE STRUCTURES
Filed May 2, 1960  15 Sheets-Sheet 13

INVENTORS
Conrad Arbter
Paul Schwendinger

By Richard Low
Agt

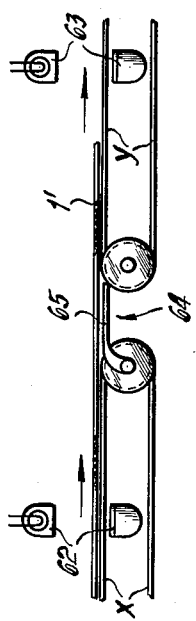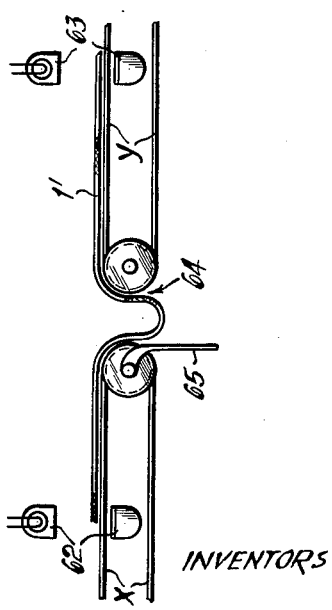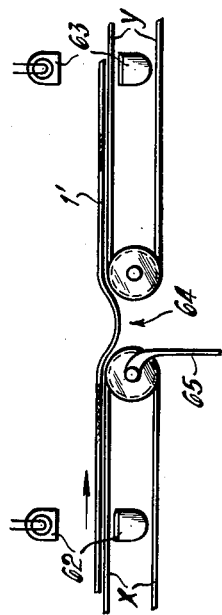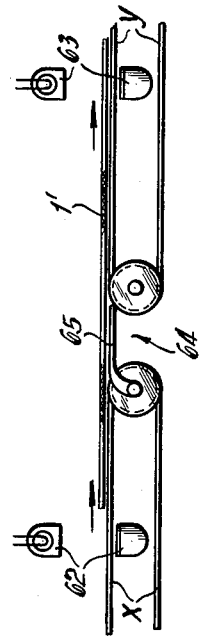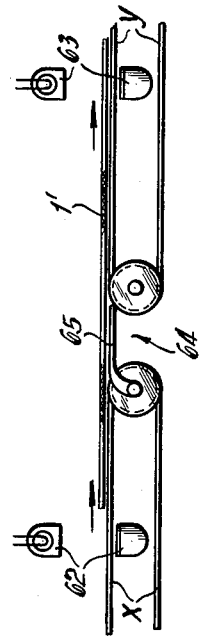

July 30, 1963
C. ARBTER ETAL
3,099,234
MANUFACTURE OF BAGLIKE STRUCTURES
Filed May 2, 1960
15 Sheets-Sheet 15
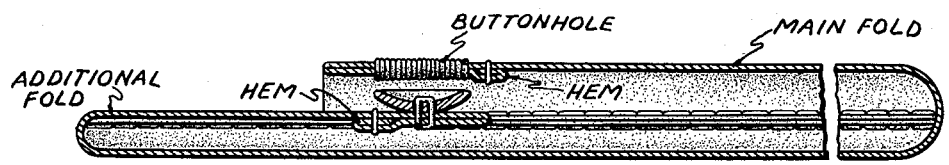
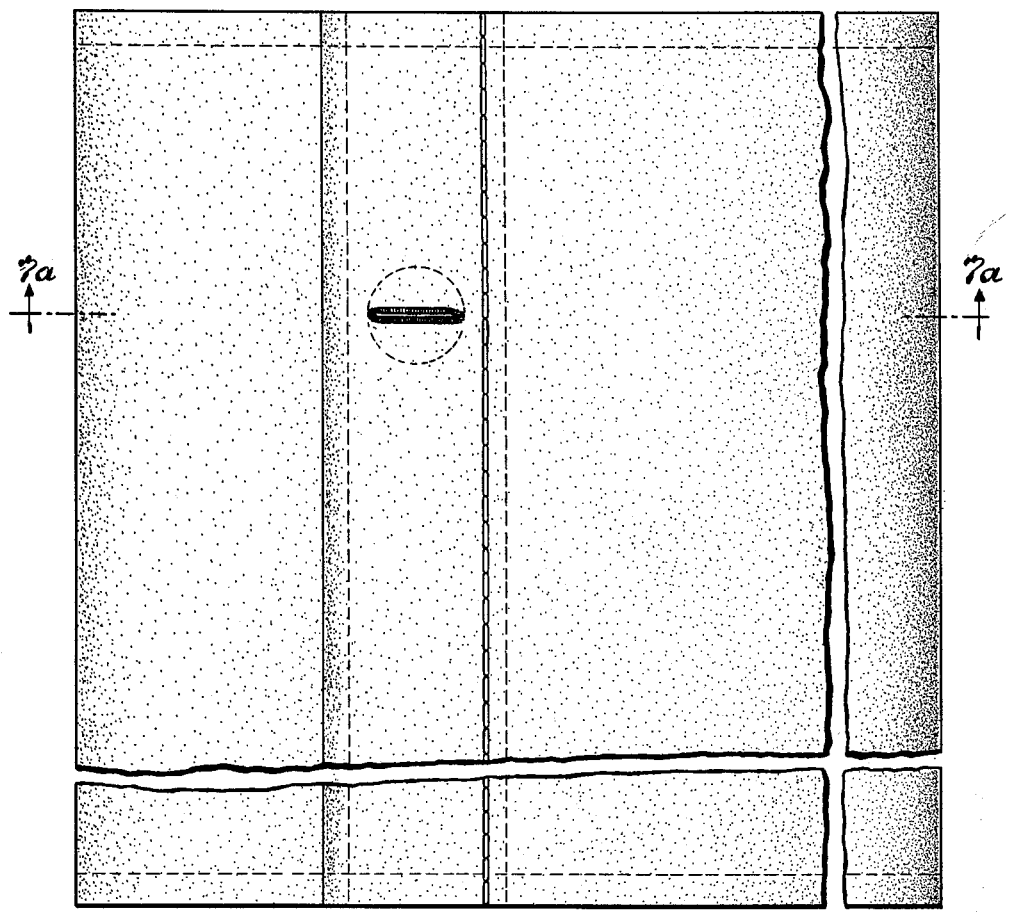
INVENTORS.
Conrad Arbter
BY Paul Schwendinger

United States Patent Office 3,099,234
Patented July 30, 1963

3,099,234
MANUFACTURE OF BAGLIKE STRUCTURES
Conrad Arbter, Saal an der Saale, Unterfranken, and Paul Schwendinger, Zell im Wiesental, Baden, Germany, assignors to Spinnerei und Webereien Zell-Schonau Aktiengesellschaft, Zell im Wiesental, Baden, Germany, a corporation of Germany
Filed May 2, 1960, Ser. No. 26,367
Claims priority, application Germany May 2, 1959
9 Claims. (Cl. 112—10)

This invention relates to the manufacture of baglike structures made of materials, such as fabrics of cotton, linen, etc. and other pliable sheet material, for instance, kraft paper, leather, plastics, with the structures being closed on three sides. The web of the material used is taken stepwise from a supply roll, cut to the desired lengths, and subjected to a number of consecutive operations. All the operations, such as cutting, hemming, sewing, folding, etc., are made to depend on the admission of the work piece being worked on to any of the existing working stations. The invention relates especially to a machine for making structures of the referred to kind.

The primary object of our invention is to generally improve the manufacture of baglike structures and, more particularly, to simplify, cheapen, and speed up such manufacture.

More specific objects will be apparent from the following detailed description.

The specification is accompanied by drawings which, by way of example, show an embodiment of the invention, and in which:

FIG. 1a illustrates an admission and cutting station as well as a hem-preparing station;

FIG. 1b shows a hem-completing or hem-sewing station;

FIG. 1c is a station for the attachment of closing means and a folding station;

FIG. 1d shows a station for lengthwise sewing and a first turning station;

FIG. 1e shows a second turning station;

FIG. 2a is a plan view of the showing of FIG. 1a;

FIG. 2b is a plan view of the showing of FIG. 1b but shows the two sewing machines illustrated in different positions;

FIG. 2c is a plan view of the showing of FIG. 1c;

FIG. 2d is a plan view of the showing of FIG. 1d;

FIG. 2e is a plan view of the showing of FIG. 1e;

Figure 5:
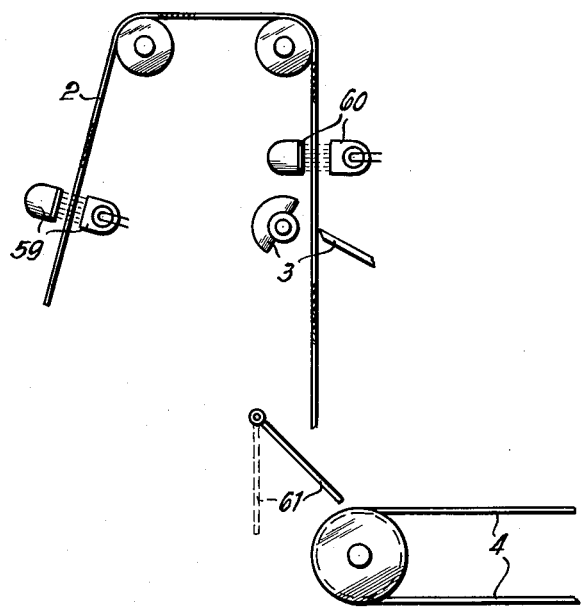

FIGS. 4a, 4b, 4c, 4d, 4e, 4f, and 4g show a turning device in seven different positions;

FIG. 5 shows a device for examining marked defects;

FIGS. 6a, 6b, 6c, and 6d show in four different positions a device to take care of varying lengths of the baglike structure;

FIG. 7a is a section taken in the plane of the line 7a—7a of FIG. 7b; and

FIG. 7b is a plan view of a finished baglike structure made according to the invention.

Referring to the drawings in greater detail, it is to be noted that the machine of the invention consists of an admission and cutting station I, a hem-preparing station II, a hem-sewing station III, a buttonhole and button sewing station IV, a folding station V, a lengthwise sewing station VI, a first turning station VII, and a second turning station VIII. These stations are associated with each other in a successive relationship. Each station is supplied by endless conveyors according to the working rhythm of the machine, so that in each of the stations a piece of work fed into the respective station is worked on. The operation is intermittently. The piece to be worked on comes in each station to a stop and stands still until the work intended to be done in the respective station is completed.

Having reference now to FIG. 1a, in the admission and cutting station I a web 2 of material is taken off a supply roll 1 and cut in a cutting device 3 to desired lengths. A blank 1' thus obtained continues on endless conveyor belts to the hem-preparing station II. In FIGS. 3a to 3d, a hem-preparing device is shown in four different positions. Both at the entrance and at the exit end of this station there is a hem-preparing device. Each of the hem-preparing devices being practically identical, only one device is being described. A suction chamber 5 extends across the entire width of the web. Each edge of the admitted blank 1' is brought to the underside of a suction chamber in the rhythm of the machine by means of a web lift 6 (see FIG. 3a). The lift 6 passes through a conveyor 4 which consists of several parallel ropes so that the lift may pass therethrough (see FIG. 2a). Due to suction, the edge of the piece 1' is held against the underside of the suction chamber 5. On the underside of the suction chamber, there are two hingedly mounted flaps 7 and 8 next to each other. The suction is exerted through channels 5' and 5" and a bore 8' in the flap 8, which bore, in the position of FIG. 3a, registers with the channel 5".

Figure 16:
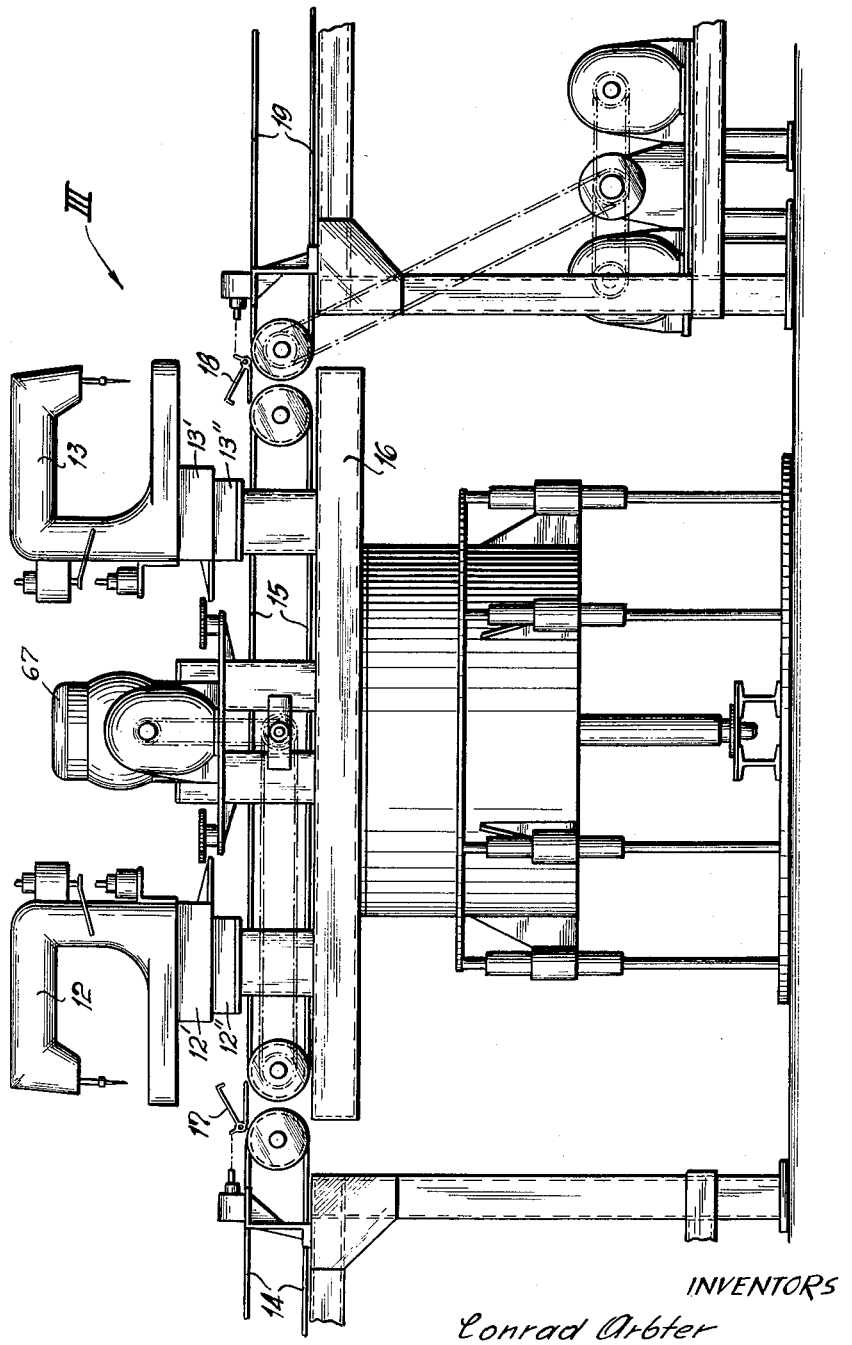
Figure 3D:
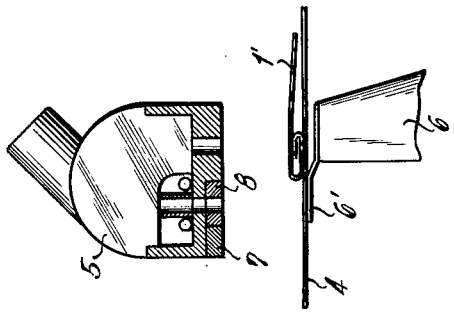
FIGS. 3a, 3b, 3c and 3d show a device for preparing hems in four different positions.
Figure 3C:
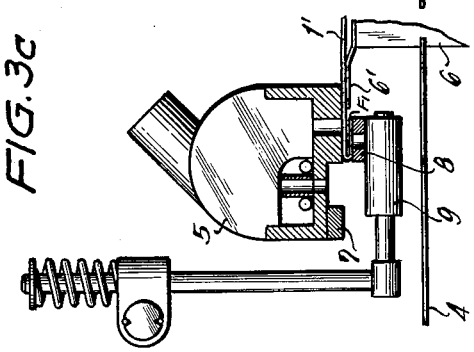
Figure 3B:
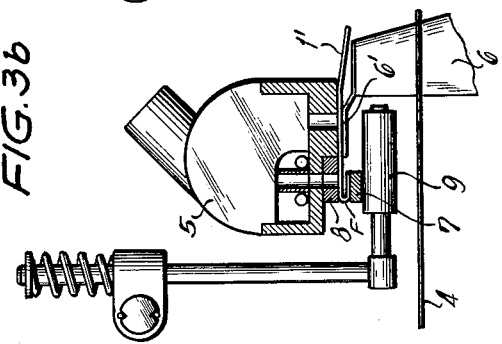
Figure 3A:
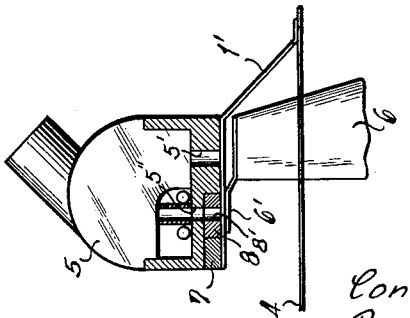

An extension 6' of the lift 6 extends as far as the left edge of the flap 8, as shown in FIG. 3a. When the flap 7 is swung from the position shown in FIG. 3a into the position shown in FIG. 3b, the edge portion of the work piece, which projects beyond the flap 8, is folded under at F. Immediately thereafter, the lift 6 moves into the position shown in FIG. 3b. At the same instant, a pressure roll 9 is made to press against the flap 7, which causes the doubled-back edge to be tightly pressed against the underside of the main portion of the work piece to be sewn on later on and to form a hem. The pressure roll 9 returns now to its nonoperative position or rest position, not shown, and the flap 8 is moved from the position of FIG. 3b into the position of FIG. 3c, thus producing a second fold at F'. Before the second fold is made, the flap 7 has been returned to its initial position shown in FIG. 3a. The pressure roll 9 is again used to press the overlying portions of the double hem formation against each other.

Upon preparation of the double hem formation and release of the vacuum in the suction chamber 5, the doubly folded edge of the work piece 1' drops back onto the conveyor 4 (see FIG. 3d). The control of the vacuum in the chamber 5 which may be heated, of the flaps 7 and 8, and of the lift 6 takes place in the rhythm of the machine, for instance, by a program switching mechanism. In FIG. 1a, magnets 10 and 11 are shown, which constitute an example of means to control the flaps 7 and 8.

In the hem-sewing station III (FIG. 1b), there are sewing machines 12 and 13 for sewing hems along both crosswise extending edges of a cut piece. Such work piece enters the hem-sewing station, while on the conveyor 14, and is moved onto the conveyor 15. The sewing machine 12 sews the hem on the leading edge of the just received work piece, whereas the sewing machine 13 sews the hem of the trailing edge of the work piece previously received. Both hems have been prepared in station II. Thus, the leading hem of the piece coming from station II and the trailing hem of the piece leaving station III are simultaneously sewn.

The sewing machines 12 and 13 are mounted on a platform 16 which can be raised and lowered. The platform may be operated, for instance, hydraulically. Carried by the platform and supporting the sewing machines is a pair of slides 12', 13' and 12", 13", respectively.

Movements of the machines in directions parallel to the conveying direction are effected by the slides 12', 13', and crosswise movements are effected by the slides 12", 13". The means for effecting the movements in the conveying action and opposite thereto are not shown. The crosswise movements of the slides 12", 13" are derived from a motor 67 over a chain drive 66 (see FIGS. 1b and 2b).

In the nonoperative condition, the sewing machines are at the raised level, that is, above the conveyor, whereby the distance between the machines is smaller than the distance between the leading edge of the work piece coming from the hem-preparing station II and the trailing edge of the work piece leaving the hem-sewing station III (FIG. 2b). The platform 16 is lowered when the pieces of work to be sewn come to a standstill in their working positions, and the thus lowered sewing machines are then moved from each other (see FIG. 1b) toward the hemmed edges to receive same for sewing and to do the sewing. Upon completion of the sewing, the machines are raised back to their nonoperative positions and moved toward each other. Sewn pieces of work move on, while pieces to be sewn move into the hem-sewing station.

At the entrance and exit side of station III, there is, for instance, a holding and clamping device generally designated 17 and 18. These devices form no part of our invention and need not be described in detail. Their function is to hold fast the double hem-formation prepared in station II during sewing in station III.

The buttonhole and button sewing station IV (FIGS. 1c and 2c) includes a buttonhole sewing machine 26 and a button sewing machine 27. Such machines are known in the art. We prefer to provide as many machines next to each other along crosswise extending lines as there are buttonholes and buttons to be sewn, but it is also possible to get along with a single machine which is movable perpendicularly to the conveyor movement of the machine and whereby the sewing operations take place one after another. The sewing machines 26 and 27 are carried by a lifting platform 28.

The sewing machine 26 works on the right-hand edge of the pieces coming from station III, and the machine 27 works on the left-hand edge of the pieces leaving station IV. Similar to the conditions in the hem-sewing station III, the distance between the sewing machines of station IV, while at the upper level or in the nonoperative position, is smaller than the distance between the hemmed edges. Upon lowering the platform 28 and the sewing machines 26 and 27, the latter are moved apart to receive the hemmed edges for the buttonhole-sewing and the button-sewing.

In the folding station V (see again FIG. 1c), the piece which has been hemmed along the cut edges, and provided with button holes and buttons, is folded about a crosswise extending line, so that a baglike structure forms which, for the time being, is still open along the lengthwise running edges. The device for such folding is known per se. It provides that the piece to be folded be held along the folding edge, for instance, by suction, and that the part of the piece which is to be doubled back be seized by swinging and grasping arms 29 performing the folding about the folding edge in the direction of the arrow 30.

In some cases, it is necessary or desirable to form an additional fold at one of the open edges of the baglike structure. Such fold offsets the respective edge inwardly and helps form a safer case for a pillow or blanket by more safely preventing the pillow or blanket from slipping out. The fold is made by arresting the movement of the work piece, while on the conveyor 36, so that the trailing end of the piece will lie over the flap or tongue 31 (see FIGS. 1c and 2c). The tongue turns clockwise about 31' and is actuated by a motor 68.

In the lengthwise sewing stations VI (FIGS. 1d and 2d), the piece is sewn along the longitudinal edges into a baglike structure, which is done by two sewing machines 32 and 33 mounted to be moved towards each other, with the machine 32 moving in the direction of the arrow 34, and the machine 33 in the direction of the arrow 35.

One of the machines 32 and 33 sews one edge, and the other machine the opposing edge. The work piece enters the station VI on a conveyor 36 and continues on a conveyor 37. When it reaches the proper position in the station VI, the machines 32, 33 assume the operating position. In the nonoperative condition, the distance between the two machines is smaller than the width of the piece to be worked, which has the purpose of preventing that the lengthwise extending edges of the piece are taken along when the machines are moved from a larger distance to a smaller one and the material of the piece becomes crowded and contracts into wrinkles. Thus, there is at the same time the possibility of working materials of varying widths on the same machine within certain limits. The movement of the two machines 32 and 33 into the position of the correct distance is done by photo cell control which feels the width of the piece.

The bag or case leaving station VI is closed along three sides. In preparing the bag for the station VI, the single-ply material of the work piece has been folded either once or twice, one fold being the main fold made by means of the swinging arms 29, the other fold being what is referred to hereinbefore as an "additional fold" produced by means of the tongue 31 (FIGS. 1c and 2c). The additional fold is made after the main fold has been made and the work piece has been transferred to the conveyor 36.

The bag must now be turned inside out to make the lengthwise running seams and crosswise running hems, now outside and visible, come inside and become invisible. Depending on whether or not there are two folds, the main and additional folds, or a single fold only, the main fold, there are two turning stations or a single turning station. FIGS. 1d and 2d show a first turning station VII and FIGS. 1e and 2e show a second turning station VIII. Since the devices for turning in both of these stations are essentially the same, only one of them is described, that is, the device for turning the additional fold, thereby referring to FIGS. 4a to 4g.

Figure 4A:
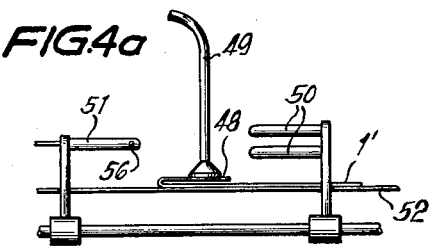
Figure 4B:
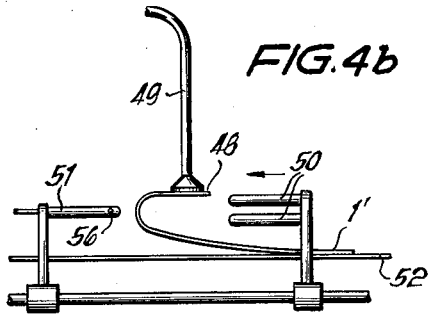
Figure 4C:
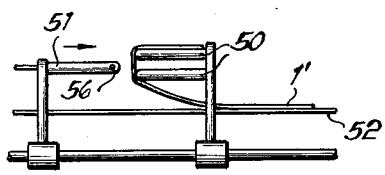
Figure 4D:
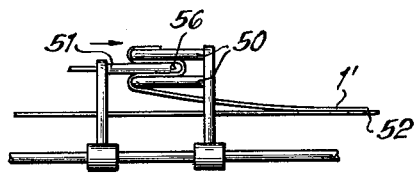
Figure 4E:
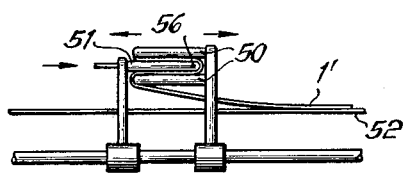
Figure 4F:
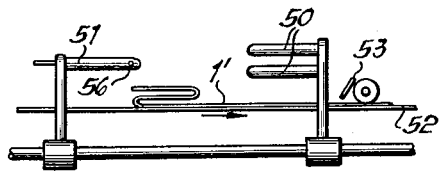
Figure 4G:
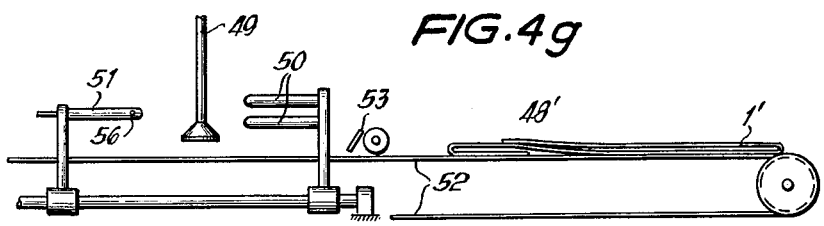

As can be seen from FIG. 4a, the turned-in portion 48 of the additional fold of the work piece 1' is grasped by suction nozzles 49 and opened, as can be seen from FIG. 4b. For simplicity's reason, no hem is shown. In the opening thus produced by the nozzles 49, a pair of fingers 50 enters along each edge. Each pair cooperates with a finger 51 on the opposing side so that the additional fold will be turned, as can be seen from FIGS. 4c, 4d, and 4e. As will be clear from the arrows indicated in the views, the finger pair 50 first makes a move to the left, whereupon the finger 51 moves in the opposing direction. The additional fold has been turned when the finger pair 50 and the finger 51 move apart (FIG. 4f). The bag is now moved by a conveyor 52 away from the position of FIG. 4f and placed upside down by a stop 53 (4g), so that the main fold designated 48' in FIG. 4g is located so that it can be turned in the same way in the next turning station VIII (FIG. 2e). The fingers necessary to this operation are identified by 54 and 55, respectively.

It is important, when the turning is done, that all corners are properly pushed out and the side seams flattened. In order to achieve this, the fingers 51 and 55, respectively, are provided with sideways projecting pins 56 which become effective when the position of FIG. 4e is reached and the fingers are withdrawn from the turned bag. At this time the pressure pins 56 emerge sideways from the fingers 51 and 55 and thrust into the corners of the turned bag. The control of these pressure pins takes place likewise in dependence on the working rhythm of the machine, for instance, lifting magnets. Such lifting magnets are shown in FIGS. 1d and 1e and are designated 57 and 58, respectively.

It is advisable to arrange the fingers, when entering the bag or a portion thereof, to be first at a smaller distance from each other and then to gradually assume, as they stretch the bag, the proper working position.

In order to minimize rejections caused by defects in the material or in seams and hems, there is a device provided which is shown in FIG. 5. The web 2, when coming from the roll 1, runs over an inspecting device 59 to check errors marked on the web. Upon the passage over guide rolls, the web 2 comes to another inspecting device 60 which reacts when the device 59 has reacted. The device 60 controls the cutting device 3 which thus becomes effective when a defect or damage is reported so that cutting is caused immediately after the defective area. In addition, the inspection device 60 controls a trap 61 which is moved from the solid line position into the dotted line position so that the cut piece does not get on the conveyor 4 but drops to the ground. However, a trap like the one designated 61 may be omitted if provision is made to effect an immediate reversal of the moving direction of the conveyor.

FIGS. 6a to 6d show a device which makes it possible to make articles of varying length. According to FIG. 6a, a given minimum length of the work piece is determined by the distance of two sensing members 62, 63. Between these members, there is a gap 64 between the conveyor x and the conveyor y. If the length of the piece to be made is larger than the distance between the sensing members 62 and 63, the conveyor y is stopped as soon as the leading edge of the work piece reaches the sensing member 63. At the same time, the flap door 65 drops downward (see FIG. 6b) so that the gap 64 stays open. The conveyor x continues to work and the added length of the work piece hangs down into the gap 64, as shown in FIG. 6c. When the trailing edge of the work piece has reached the sensing member 62, the conveyor x stops, and now both edges can be worked on. As soon as this work is completed, the conveyor y is started until the portion of the work piece hanging down into the gap disappears, whereupon the conveyor x begins to operate and the flap door 65 is closed.

Similar or like gaps as the one just explained, bridged by a flap which opens by moving either upwardly or downwardly, can be provided at other places in the path of transportation and can be used to discharge pieces defective in other respects, while still within the machine, for instance, a piece not provided with the desired number of buttonholes.

It is believed that the method of our invention, as well as the construction and operation of a preferred form of machine for practicing the invention, and the many advantages thereof, will be fully understood from the foregoing detailed description. It will be apparent that the various elements of the machine of the invention to do the cutting, folding, hemming, seaming, etc. are all operated according to the rhythm of the machine. The baglike structure of the invention is intended for industrial shipping purposes, as a laundry bag, garment bag, traveling bag, and for innumerable other uses. It will be appreciated that slide fasteners, snap fasteners, and other closing means may be used along the open edges of the bags.

It will also be clear that, while we have shown and described our invention in a single form only, many changes and modifications may be made without departing from the spirit of the invention defined in the following claims.

We claim:

1. A machine for the manufacture of baglike structures from pliable sheet material, closed along three sides, including (1) means for crosswise cutting a web of the material used, pieces of work obtained by cutting having two crosswise extending cut edges and an end portion along each of said edges, each of said end portions having a marginal part, (2) means for preparing a hem by making a fold along each of said edges, (3) means for completing said hems by sewing down the folded edges, and (4) conveying means for intermittently feeding said web to said cutting means, and for intermittently and successively transporting cut pieces of work to said hem-preparing and hem-completing means, said hem-preparing means including (a) suction means extending above, and across the width of, said end portions,
   (b) means to raise said end portions from the transporting level to a higher level and against said suction means, and
   (c) flap means mounted on said suction means for swinging movements to act upon the marginal part of each of said edge portions and to fold said marginal parts.

2. In the machine according to claim 1, said flap means including two flaps, each flap being mounted for independent swinging movements, said raising means being mounted to be horizontally movable and to cooperate with each of said flaps, one flap being arranged for the action on said marginal part, the other flap being adapted to make a double fold.

3. The machine according to claim 1, further including first folding means, second folding means, and means for intermittently transporting crosswise hemmed pieces of work to said first and second folding means, said first folding means being adapted to fold said hemmed pieces approximately midway between said hems and thus to make a main fold, said second folding means being adapted to make an additional fold along an open edge of the pieces folded midway.

4. The machine according to claim 3, further including turning means, and means for intermittently transporting said midway and additionally folded pieces to said turning means, said turning means being composed of two units to turn both said main and said additional fold inside out, each unit including suction nozzle means to lift the upper sheet of material of the two fold-forming sheets away from the lower sheet of material and to make said upper sheet assume a curved formation, and two groups of finger means extending, and mounted to be movable, toward and from each other, with one of said groups acting, when said groups move toward each other, upon the convex side of said curved formation, and the other group acting upon the concave side.

5. In the machine according to claim 4, the fingers of said group which acts upon said convex side being provided with pressure pins adapted to emerge sideways when the groups move apart.

6. The machine according to claim 1, further including inspecting means and trap means, said inspecting means being arranged so that said web passes said inspecting means before said cutting means are reached, said trap means being arranged along the path of said web ahead of said cutting means, when viewed in the feeding direction, said inspecting means being adapted to sense defects of the material and to actuate said trap means to divert defective cut pieces of work from the further path through the machine.

7. The machine according to claim 1, further including inspecting means arranged so that said web passes said inspecting means before said cutting means are reached, said inspecting means being adapted to sense defects of the material and to reverse, upon sensing a defect, transportation of a defective cut piece.

8. The machine according to claim 1, further including inspecting means arranged so that said web passes said inspecting means before said cutting means are reached, said inspecting means being adapted to sense defects of the material and cause said cutting means to cut immediately after the defective area.

9. In the machine according to claim 1, said conveying means including at least two successive conveyors separated by a gap and bridged by a flap-door, said gap serving to adjust the machine to variable lengths of pieces of work, sensing means on each side of the gap to independently operate said two conveyors and flap door, allowing an added length of each work piece to hang through the open flap door.

References Cited in the file of this patent
UNITED STATES PATENTS

| | | |
|---|---|---|
| 2,272,716 | Lowe | Feb. 10, 1942 |
| 2,274,622 | West | Feb. 24, 1942 |
| 2,504,974 | Golden | Apr. 25, 1950 |
| 2,524,982 | Levitt | Oct. 10, 1950 |
| 2,667,132 | Golden | Jan. 26, 1954 |
| 2,789,610 | Pritchard | Apr. 23, 1957 |
| 2,867,183 | Klasing | Jan. 6, 1959 |
| 2,878,849 | Lingenfelter et al. | Mar. 24, 1959 |
| 2,940,404 | Damon | June 14, 1960 |
| 2,962,989 | Golden | Dec. 6, 1960 |
| 3,044,517 | Levi | July 17, 1962 |